3,396,208
HIGH TEMPERATURE METHYLATION OF OLEFINS

Eric J. Y. Scott, Princeton, N.J., assignor to Mobil Oil Corporation, a corporation of New York
No Drawing. Filed Sept. 16, 1966, Ser. No. 579,835
6 Claims. (Cl. 260—683)

ABSTRACT OF THE DISCLOSURE

Propylene and isobutylene are methylated to form a linear 1-olefin having 4 or 5 carbon atoms, respectively, by contacting them with a $C_1$, $C_3$ or $C_4$ alkane at 1000–1200° C. for 1–2 milliseconds, and rapidly cooling the resulting reaction mixture.

---

This invention relates to a high temperature method for producing certain 1-olefins by methylating a 1-olefin which has one less carbon atom, and which is more available, than the product. The method is thus useful to convert a lower cost olefin to one of higher value.

In particular, the invention comprises forming as product a linear olefin having a terminal double bond and 4 to 5 carbons from a reactant olefin selected from propylene and isobutylene comprising mixing the reactant olefin with an alkane having 1 to 4 carbons, except ethane, passing the mixture through a reaction zone heated to a temperature in the range of 1000 to 1200° C. and at a rate such that the reactants are exposed to said temperature for a period of only 1 or 2 milliseconds, then rapidly cooling the reaction mixture, and thereby converting about 4 or 5 to 15% by weight of the reactant olefin to products of which the major amount is the said linear olefin.

The olefin reactant, as indicated, comprises propylene and isobutylene. These olefins are noteworthy for being readily available and for containing reactive hydrogen atoms. Propylene is further noteworthy in being capable of forming allyl free radical, $\dot{C}H_2CH=CH_2$, which has a reactive carbon in the "allylic" position, i.e., the carbon not connected to the double bond and over which the dot appears. Isobutylene is similarly noteworthy in being capable of forming methallyl free radical, $\dot{C}H_2C(CH_3)=CH_2$, which has a reactive carbon in the "methallylic" position, i.e., the carbon over which the dot appears. Furthermore, the allyl and methallyl free radicals are substantially stable against further decomposition to small fragments, and, although formed by abstraction of hydrogen from the parent olefin, are themselves resistant to further hydrogen abstraction.

The alkane reactant provides methyl free radicals at the temperature of the reaction, these radicals acting to methylate the reactant olefin to form the desired product. Propane is a preferred alkane, although methane, butane, and isobutane may be used. As indicated, ethane is not suitable as it does not provide methyl free radicals.

The reaction conditions have been indicated in part. Thus the temperature is quite high, ranging from 750 to 1500° C., preferably 1000 to 1200° C., and the time is very short, on the order of at least 1 millisecond, preferably from 1 to 2 milliseconds. In addition, the pressure may range up to 5 or 10 p.s.i.g. in order to help move the reactants through the system. The olefin:alkane ratio is at least 1:1, and it may range up to 1:10, molar basis; preferably it is 1:1 to 1:2. An inert carrier gas like nitrogen, helium, carbon dioxide, and the like is usefully added to the reactant mixture; its use decreases the partial pressure of the reactants, thus reducing the conversion at a given temperature and also the contact time, and thereby increasing the specificity of the reaction. Nitrogen is a preferred carrier. It may also be noted that such carriers serve as an aid to evaluate any volume change during a reaction.

Essentially, the method comprises metering the reactant gases and the carrier gas from respective supply sources, mixing the gases, pumping the mixture preferably through a preheater wherein a swirling action may be imparted, then reacting the mixture in a suitable reaction zone under the conditions noted, immediately quenching the reaction mixture as by introducing a cool inert quench gas such as helium, nitrogen, water vapor, and the like, metering the reaction mixture, and separating the desired product. Quenching, of course, is to enable the desired product substantially to avoid decomposition.

Although the invention is not to be limited by theory, it is considered that methyl free radicals, $\dot{C}H_3$, formed by decomposition of the alkane, abstract a hydrogen atom (an "allylic" hydrogen) from the carbon in the allylic position of the reactant olefin, as may be illustrated, in the case of propylene, as follows:

$$\dot{C}H_3 + CH_3CH=CH_2 \rightarrow CH_4 + \dot{C}H_2CH=CH_2 \quad (1)$$

The allyl free radical in Reaction 1 is stable enough during the reaction period to react with another methyl free radical to form the desired product, as follows:

$$\dot{C}H_3 + \dot{C}H_2CH=CH_2 \rightarrow CH_3CH_2CH=CH_2 \quad (2)$$

The over all reaction is

$$2\dot{C}H_3 + CH_3CH=CH_2 \rightarrow CH_3CH_2CH=CH_2 + CH_4 \quad (3)$$

It may be noted that the free radicals involved in the foregoing reactions are methyl and allyl radicals. When isobutylene is the reactant olefin, the free radicals are methyl and methallyl. These radicals are substantially stable against decomposition to smaller fragments, and they are also stable against loss of hydrogen atoms. Methyl and allyl, or methyl and methallyl, are therefore able to combine to an appreciable extent to form desired product.

By limiting the conversion of the olefin reactant, good selectivity is obtained for the product. Desirably the conversion is in the range of 4 or 5 to 15% by weight, and preferably 4 or 5 to 10%. At these conversions, yields of desired product may comprise a major amount, ranging up to 70 or 80% by weight, based on the products formed. The products of interest, butene-1 and 2-methylbutene-1, are important monomers for the production of useful polymers by conventional methods.

The invention may be illustrated by the following examples.

EXAMPLE 1

Propylene was reacted with propane in a reactor comprising a thin-walled quartz liner inserted into a piece of 446 chromium steel tubing. A closely fitting cylinder of Inconel metal surrounded the tubing and provided a heat sink for the reactor; it was heated by an induction coil which was activated by a 6-kw. spark-gap converter. The reactor temperature was measured by a thermocouple positioned close to the reactor wall. The propylene and propane were mixed with nitrogen and first passed through a preheater at 200° C., in which swirl was imparted to the mixture, and then introduced to the reactor. The resulting mixture was analyzed by gas chromatography and by mass spectrometer analysis. The following data was obtained:

|  | Mole percent |
|---|---|
| Nitrogen | 16 |
| Propylene | 42 |
| Propane | 42 |

| Reactor Temp. (° C.) | 1,100 | 1,150 | 1,200 |
|---|---|---|---|
| Residence Time (msec.) | 1.6 | 1.5 | 1.4 |
| Conversion percent, based on propylene | 7 | 15 | 34 |
| Yield of butene-1 based on products | 73 | 45 | 20 |

The conversions and yields are on a weight basis. Thus, the conversion figure of 7% means that 7% by weight of the total propylene charged was converted to various products, and the yield figure of 73% means that 73% by weight of these products was butene-1. When propane was omitted from the charge mixture, so that the latter comprised only nitrogen (58 mole percent) and propylene (42 mole percent), approximately 6% of the propylene was converted at 1100° C. and 1.6 msec., but the yield of butene-1 was only 25%.

EXAMPLE 2

Isobutylene and propane were reacted in the manner described in Example 1, with the following results:

|  | Mole percent |
|---|---|
| Nitrogen | 16 |
| Isobutylene | 42 |
| Propane | 42 |

| Reactor Temp. (° C.) | 1,025 | 1,050 | 1,100 |
|---|---|---|---|
| Residence Time (msec.) | 1.7 | 1.7 | 1.6 |
| Conversion percent, based on isobutylene | 4 | 9 | 15 |
| Yield of 2,methyl-butene-1, based on products | 47 | 33 | 29 |

When propane was omitted from the charge mixture, so that the latter comprised only nitrogen (58 mole percent) and isobutylene (42 mole percent), approximately 9% of the isobutylene was converted at 1100° C. and 1.6 msec., but the yield of 2-methylbutene-1 was only 23%.

It will be understood that the invention is capable of obvious variations without departing from its scope.

In the light of the foregoing description, the following is claimed.

1. Method for producing as product a linear olefin having a terminal double bond and 4 to 5 carbons from a reactant olefin selected from propylene and isobutylene, comprising forming a mixture of said reactant olefin, an alkane having 1, 3 or 4 carbons, and an inert carrier gas in which the proportion of said reactant olefin to alkane varies from 1:1 to 1:10, molar basis, flowing the mixture rapidly through a reaction zone heated to a temperature in the range of 1000 to 1200° C. so that the reactants are exposed to said temperature for a time of 1 to 2 milliseconds, rapidly cooling the reaction mixture, thereby converting about 4 to 15% by weight of said reactant olefin to products of which the major proportion is said product olefin, and recovering the latter.

2. Method of claim 1 wherein said reactant olefin is propylene, said alkane is propane, and about 7 to 15% by weight of the reactant olefin is converted to products of which 73 to 45% by weight comprises butene-1.

3. Method of claim 1 wherein said reactant olefin is isobutylene, said alkane is propane, and about 4 to 15% by weight of the reactant olefin is converted to products of which 47 to 29% by weight comprises 2-methylbutene-1.

4. Method for producing as product a linear olefin having a terminal double bond and 4 to 5 carbons from a reactant olefin selected from propylene and isobutylene, comprising forming a mixture of said reactant olefin, an alkane having 1, 3 or 4 carbons, and an inert carrier gas in which the proportion of said reactant olefin to alkane is at least 1:1, molar basis, flowing the mixture rapidly through a reaction zone heated to a temperature in the range of 750 to 1500° C. so that the reactants are exposed to said temperature for a time of the order of 1 millisecond, rapidly cooling the reaction mixture thereby converting about 4 to 15% by weight of said reactant olefin to products of which the major proportion is said product olefin, and recovering the latter.

5. Method of claim 4 wherein said reactant olefin is propylene, said alkane is propane, and about 7 to 15% by weight of the reactant olefin is converted to products of which 73 to 45% by weight comprises butene-1.

6. Method of claim 4 wherein said reactant olefin is isobutylene, said alkane is propane, and about 4 to 15% by weight of the reactant olefin is converted to products of which 47 to 29% by weight comprises 2-methylbutene-1.

References Cited

FOREIGN PATENTS 1,049,046  11/1966  Great Britain.

DELBERT E. GANTZ, *Primary Examiner.*

J. D. MYERS, *Assistant Examiner.*